(12) United States Patent
Lindoff

(10) Patent No.: US 8,385,833 B2
(45) Date of Patent: Feb. 26, 2013

(54) ADAPTIVE IDLE MODE MEASUREMENT METHODS AND APPARATUS

(75) Inventor: Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 674 days.

(21) Appl. No.: 12/510,388

(22) Filed: Jul. 28, 2009

(65) Prior Publication Data

US 2010/0279638 A1  Nov. 4, 2010

Related U.S. Application Data

(60) Provisional application No. 61/174,067, filed on Apr. 30, 2009.

(51) Int. Cl.
*H04B 17/00* (2006.01)
*H04K 3/00* (2006.01)

(52) U.S. Cl. ..................... 455/67.11; 455/436

(58) Field of Classification Search ............. 455/67.11, 455/436–437
See application file for complete search history.

(56) References Cited

U.S. PATENT DOCUMENTS

| | | | |
|---|---|---|---|
| 5,564,090 A | 10/1996 | Beauchamp et al. | |
| 7,313,116 B2 | 12/2007 | Lee et al. | |
| 2006/0072524 A1 | 4/2006 | Perahia et al. | |
| 2006/0223557 A1 | 10/2006 | Manohar | |
| 2007/0298780 A1 | 12/2007 | Lindoff et al. | |
| 2008/0123570 A1 | 5/2008 | Yin | |
| 2008/0189970 A1 | 8/2008 | Wang et al. | |
| 2008/0274742 A1 | 11/2008 | Bi | |
| 2008/0318577 A1 | 12/2008 | Somasundaram et al. | |
| 2009/0088160 A1 | 4/2009 | Pani et al. | |
| 2009/0197555 A1* | 8/2009 | Lindoff et al. | 455/226.2 |
| 2009/0318090 A1* | 12/2009 | Flordelis et al. | 455/67.13 |
| 2010/0056157 A1* | 3/2010 | Verona et al. | 455/438 |
| 2011/0319032 A1* | 12/2011 | Pica et al. | 455/67.13 |

FOREIGN PATENT DOCUMENTS

| | | |
|---|---|---|
| GB | 2355366 A | 4/2001 |
| WO | 01/47136 A1 | 6/2001 |
| WO | 01/76087 A1 | 10/2001 |
| WO | 01/76092 A2 | 10/2001 |
| WO | 02/087106 A1 | 10/2002 |
| WO | 03/038467 A2 | 5/2003 |
| WO | 2009/007720 A2 | 1/2009 |

(Continued)

OTHER PUBLICATIONS

EPO, Int'l Search Report in PCT/EP2010/055625, Sep. 6, 2010.

(Continued)

*Primary Examiner* — Lee Nguyen
(74) *Attorney, Agent, or Firm* — Potomac Patent Group PLLC

(57) ABSTRACT

Methods and apparatus in a receiver for selecting among methods of estimating a received power of at least one signal based on whether inter-frequency or inter-radio-access-technology received power measurements are needed. A method includes using a first method of measuring the received power based on the pattern to generate a first power estimate based on a first duration of the at least one signal; comparing the first power estimate to a first threshold; and based on the comparing, either using the first method of measuring to generate another first power estimate or using a second method of measuring the received power based on the pattern to generate a second power estimate, the second method being different from the first method and the second power estimate being based on a second duration of the at least one signal, and measuring a received power of at least one signal having a second carrier frequency.

18 Claims, 5 Drawing Sheets

FOREIGN PATENT DOCUMENTS

| | | |
|---|---|---|
| WO | 2009/030289 A1 | 3/2009 |
| WO | 2009/054702 A1 | 4/2009 |

OTHER PUBLICATIONS

EPO, Written Opinion in PCT/EP2010/055625, Sep. 6, 2010.

Nokia: "UE RSRP measurement accuracy" 3GPP Draft; R4-070611, 3rd Generation Partnership Project, Mobile Competence Centre; 650, Route Des Lucioles; F-06921 Sophia-Antipolis Cedex; France; vol. RAN WG4, No. Kobe, Japan; May 2, 2007, XP050177087.

Motorola, E-UTRAN Measurement Gap Control for Inter-Frequency and Inter-RAT Handover, Tdoc R2-072012, May 7, 2007, 3GPP.

Nokia, UE RSRP Measurement Accuracy, Tdoc R4-070611, May 7, 2007, 3GPP.

D. Perels et al., An Automatic Gain Controller for MIMO-OFDM WLAN Systems, 4th Euro Conf Circuits and Systems for Comms, Jul. 10, 2008, pp. 246-251, IEEE.

\* cited by examiner

ADAPTIVE IDLE MODE MEASUREMENT METHODS AND APPARATUS

This application claims the benefit of the filing date of U.S. Provisional Patent Application No. 61/174,067 filed on Apr. 30, 2009, which is incorporated by reference in this application.

BACKGROUND

This invention relates to radio communication systems and more particularly to measurement of received signal power in such systems.

In the continuing evolution of mobile cellular radio standards like GSM and wideband code division multiple access (WCDMA), new transmission techniques like orthogonal frequency division multiplex (OFDM) will be used in new cellular communication systems. Furthermore, to migrate smoothly from existing cellular systems to new high-capacity, high-data-rate systems in the existing radio spectrum, the new systems have to be able to operate with flexible communication channel bandwidths.

One such new flexible cellular communication system is called Third Generation Long Term Evolution (3G LTE), which is currently being standardized by the Third Generation Partnership Project (3GPP). The 3G LTE specifications can be seen as an evolution of the current WCDMA specifications also promulgated by the 3GPP. A 3G LTE system will use OFDM as a multiple access technique (called OFDMA) in the downlink (DL) from system nodes to user equipments (UEs), will operate with channel bandwidths ranging from about 1.4 megahertz (MHz) to about 20 MHz, and will support data rates up to 100 megabits per second (Mb/s) on the largest-bandwidth channels. Besides high-data-rate services, 3G LTE systems are expected to provide low-data-rate services, such as speech. Because 3G LTE is designed for packet data according to the familiar transmission control protocol/internet protocol (TCP/IP), it is expected that the service that carries speech will use voice-over-IP (VoIP).

In an OFDMA communication system, the data stream to be transmitted is portioned among a number of narrowband subcarriers that are transmitted in parallel. In general, a resource block devoted to a particular UE is a particular number of particular subcarriers used for a particular period of time. Different groups of subcarriers can be used at different times for different users. Because each subcarrier is narrowband, each carrier experiences mainly flat fading, which makes it easier for a UE to demodulate each subcarrier. OFDMA communication systems are described in the literature, for example, U.S. Patent Application Publication No. US 2008/0031368 A1 by B. Lindoff et al.

FIG. 1 depicts a typical cellular communication system 10. Radio network controllers (RNCs) 12, 14 control various radio network functions, including for example radio access bearer setup, diversity handover, etc. In general, each RNC directs calls to and from a UE, such as a mobile station (MS), mobile phone, or other remote terminal, via appropriate base station(s) (BSs), which communicate with each other through DL (or forward) and uplink (UL, or reverse) channels. In FIG. 1, RNC 12 is shown coupled to BSs 16, 18, 20, and RNC 14 is shown coupled to BSs 22, 24, 26.

Each BS, or Node B in 3G vocabulary, serves a geographical area that is divided into one or more cell(s). In FIG. 1, BS 26 is shown as having five antenna sectors S1-S5, which can be said to make up the cell of the BS 26, although a sector or other area served by signals from a BS can also be called a cell. In addition, a BS may use more than one antenna to transmit signals to a UE. The BSs are typically coupled to their corresponding RNCs by dedicated telephone lines, optical fiber links, microwave links, etc. The RNCs 12, 14 are connected with external networks such as the public switched telephone network (PSTN), the internet, etc. through one or more core network nodes, such as a mobile switching center (not shown) and/or a packet radio service node (not shown).

It should be understood that the arrangement of functionalities depicted in FIG. 1 can be modified in 3G LTE and other communication systems. For example, the functionality of the RNCs 12, 14 can be moved to the Node Bs 22, 24, 26, and other functionalities can be moved to other nodes in the network. It will also be understood that a base station can use multiple transmit antennas to transmit information into a cell/sector/area, and those different transmit antennas can send respective, different pilot signals.

FIG. 2 is a frequency-vs.-time plot showing an arrangement of DL subcarriers in an OFDM communication system, such as a 3G LTE system. As shown in FIG. 2, a resource block includes twelve subcarriers spaced apart by fifteen kilohertz (kHz), which together occupy 180 kHz in frequency and 0.5 millisecond (ms) in time, or one time slot. FIG. 2 shows each time slot including seven OFDM symbols, or resource elements (REs), each of which has a short (normal) cyclic prefix, although six OFDM symbols having long (extended) cyclic prefixes can also be used in a time slot. It will be understood that resource blocks can include various numbers of subcarriers for various periods of time.

An important aspect of a 3G LTE system is the mobility of the UEs, and so fast and efficient cell search and received signal power measurements are important for a UE to get and stay connected to a suitable cell, which can be called the "serving cell", and to be handed over from one serving cell to another. Furthermore, operators will deploy LTE gradually in time and location, and so Inter-Radio Access Technology (IRAT) mobility will be an important functionality. Mobility from a GSM/WCDMA system to an LTE system is just one of many examples of IRAT mobility.

In current 3G LTE specifications, handover decisions are based on measurements of reference signal received power (RSRP), which can be defined as the average received signal power of reference signals or symbols (RS) transmitted by a Node B. A UE measures RSRP on its serving cell as well as on neighboring cells that the UE has detected as a result of a specified cell search procedure, which can involve intra-frequency RSRP measurements, inter-frequency RSRP measurements, or IRAT measurements, as specified for example in Section 5.2 of 3GPP TS 36.304 V8.4.0, User Equipment (UE) Procedures in Idle Mode (Release 8) (December 2008).

The RS, or pilots, are transmitted from each Node B at known frequencies and time instants, and are used by UEs for synchronization and other purposes besides handover. Such reference signals and symbols are described for example in Sections 6.10 and 6.11 of 3GPP Technical Specification (TS) 36.211 V8.4.0, Physical Channels and Modulation (Release 8), September 2008.

RS are transmitted from each of possibly 1, 2, or 4 transmit antennas of a Node B on particular REs that can be conveniently represented on the frequency-vs.-time plane as depicted in FIG. 3. It will be understood that the arrangement of FIG. 3 is just an example and that other arrangements can be used.

FIG. 3 shows two successive time slots, indicated by the vertical solid lines, which can be called a sub-frame. FIG. 3 also shows two resource blocks, which are indicated by the dashed lines. The frequency range depicted in FIG. 3 includes about twenty-six subcarriers, only nine of which are explicitly indicated. RS transmitted by a first transmit (TX) antenna of a Node B are denoted R and by a possible second TX antenna in the node are denoted by S. In FIG. 3, RS are depicted as transmitted on every sixth subcarrier in OFDM symbol 0 and OFDM symbol 3 or 4 (depending on whether the symbols have long or short cyclic prefixes) in every slot. Also in FIG. 3, the RSs in symbols 3 or 4 are offset by 3 subcarriers relative to the RS in OFDM symbol 0, the first OFDM symbol in a slot.

The artisan will understand that it is desirable for a UE to base its RSRP measurements in optimal ways on RS transmitted in the serving or other cell. A cell detected in a cell search procedure but not currently connected to the UE can be called "a detected neighboring cell". Low signal-to-interference ratio (SIR) is a common situation for a detected neighboring cell because such a cell's signal power level at the UE is usually lower than the received power level of the serving cell. Different SIRs can call for different RSRP measurement methods.

Furthermore, a UE typically assumes that the characteristics of the DL channel are constant over a number of subcarriers (i.e., the channel is constant with frequency) and over a number of OFDM symbols (i.e., the channel is constant in time). Based on that assumption, the UE estimates the RSRP by coherently averaging received symbols over such a "constant" group to get a channel estimate $H_i$ for a subcarrier i, computes the square of the absolute value of the channel estimate $|H_i|^2$ to obtain a received signal power estimate over the "constant" group of symbols, and then computes a non-coherent average of such signal power estimates over several groups, e.g., an entire channel bandwidth, to determine an RSRP measurement (estimate). Two such assumed "constant" groups are indicated in FIG. 3 by the dashed lines.

In the arrangement depicted in FIG. 3, such a "simple" cell measurement method of coherent averaging followed by non-coherent averaging to estimate the RSRP can proceed as follows. The UE's baseband signal $Y_i$ corresponding to an RS $R_i$ from TX antenna 1 can be written as follows:

$$Y_i^1 = H_i^1 R_i + E_i \qquad \text{Eq. 1}$$

and the UE's baseband signal corresponding to an RS $S_i$ from a possible TX antenna 2 can be written similarly as follows:

$$Y_i^2 = H_i^2 S_i + E_i \qquad \text{Eq. 2}$$

from which the impulse response $H_i$ of the channel can be estimated using the known RS symbols $R_i$, $S_i$. It will be noted that the superscript 2 in Eq. 2 does not denote a square but a second TX antenna.

Coherent averaging of a number M of received reference symbols followed by non-coherent averaging of a number N of coherent averages (i.e., non-coherent averaging over N resource blocks) can be written as follows:

$$S^{est} = \frac{1}{N} \sum_{n=1}^{N} \left| \frac{1}{M} \sum_{m=1}^{M} RS_m^{est} \right|_n^2 \qquad \text{Eq. 3}$$

in which $S^{est}$ is the RSRP measurement (estimate) and $RS^{est}$ are channel response estimates based on the RS symbols $R_i$ or $S_i$. The non-coherent averaging is typically done over an entire UE measurement bandwidth (e.g., 1.4 MHz, or six pairs of resource blocks) to determine the total RSRP estimate.

Besides having a variable SIR, the DL channel commonly suffers from delay spread and Doppler shift, and so the channel is not constant as typically assumed, leading to increased probability of erroneous RSRP measurement values. A known solution to this problem of varying DL channels is to use more advanced methods of estimating the channel and signal power (e.g., methods based on Wiener filtering). Such more advanced methods are computationally intensive, consuming time, power, and/or hardware resources that are limited in many UEs, increase the complexity of the signal-power-estimate processing in a UE, and need to be done on each detected neighboring cell, all of which render this solution undesirable.

Cell selection and reselection in UE Idle Mode is specified in, for example, Section 5.2 of 3GPP TS 36.304. Intra-frequency cell reselection by a UE in Idle Mode in an LTE or WCDMA communication system does not affect the network unless the UE changes its location area, which is usually considered to be a "rare" event. Thus, UE intra-frequency cell reselection is usually not considered an issue from the network's perspective.

A UE can decide by itself to make inter-frequency or IRAT measurements, but typically the network orders the UE to make inter-frequency and IRAT measurements. The network, e.g., the serving cell, can ask the UE to change RAT, for example, by sending a MobilityFromEUTRACommand message that is described in Section 5.4.3 of 3GPP TS 36.331 V8.4.0, E-UTRA Radio Resource Control (RRC), Protocol Specification (Release 8) (December 2008). In preparation for such a reselection or handover, the network can also ask the UE to measure the received signal quality of a destination cell before the network decides whether to have the UE change RAT.

Measurements and messaging for cell selection and reselection operations are described in, for example, Section 5.5 of 3GPP TS 36.331. Information about the existence of other RAT cells can be provided by a cell in a suitable radio resource control (RRC), or Layer 3, message, such as those described in, for example, Section 6.3.1 of 3GPP TS 36.331. Lists of LTE, WCDMA, and GSM neighboring cells for IRAT mobility can be included in the information elements of SystemInformationBlock (SIB) Types 5, 6, and 7, respectively, and information elements of other SIB Types can include lists of other cells, e.g., CDMA2000, etc.

Because inter-frequency and IRAT cell selection/reselection typically involves signaling in the network, it is desirable to avoid UE ping-pong effects that consume network signaling resources. When ping-ponging, a UE may repeatedly do IRAT cell reselection between two (or more) RATs due to "bad", e.g., inaccurate, RSRP measurements. A simple-minded way to avoid ping-ponging is to impose tougher performance requirements on inter-frequency and IRAT cell selection/reselection, e.g., the UE can be made to make more accurate IRAT RSRP measurements at all times when it is in Idle Mode.

More accurate RSRP measurements require longer measurements of RSRP or equivalent received signal power parameters, e.g., reference signal received quality (RSRQ), received signal strength (RSSI), received subcarrier power $S_i$, SIR, etc.) in Idle Mode, which is to say that the UE must average more received signal samples over more sub-frames and might need to collect signal samples between its discontinuous reception (DRX) cycles. DRX for paging is described in Section 7.1 of 3GPP TS 36.304. This negatively affects UE idle mode power consumption in that the UE's receiver is powered up for longer times.

Therefore, there is a need for optimized measurement methods and apparatus that take both UE power consumption and network signaling resources into account.

SUMMARY

In one aspect of this invention, there is provided, in a mobile receiver in a communication system, a method of adapting operation of an idle mode of a receiver based on measurements by the receiver of a received power of at least one signal having a first carrier frequency and a pattern known to the receiver. The method includes using a first method of measuring the received power based on the pattern to generate a first power estimate based on a first duration of the at least one signal; comparing the first power estimate to a first threshold; and based on the comparing, either using the first method of measuring to generate another first power estimate or performing the following: using a second method of measuring the received power based on the pattern to generate a second power estimate, the second method being different from the first method and the second power estimate being based on a second duration of the at least one signal; and measuring a received power of at least one signal having a second carrier frequency.

In an aspect of this invention, there is provided an apparatus for adapting operation of an idle mode of a receiver based on measurements by the receiver of a received power of at least one signal having a first carrier frequency and a pattern known to the receiver. The apparatus includes a signal power estimator configured to use a first method of measuring the received power based on the pattern to generate a first power estimate based on a first duration of the at least one signal; and a control unit configured to compare the first power estimate to a first threshold, and based on the comparing, to cause the signal power estimator either to use the first method of measuring to generate another first power estimate or to use a second method of measuring the received power based on the pattern to generate a second power estimate, the second method being different from the first method and the second power estimate being based on a second duration of the at least one signal, and to measure a received power of at least one signal having a second carrier frequency.

In an aspect of this invention, there is provided a computer-readable medium containing instructions that, when executed by the computer, cause the computer to carry out a method of adapting operation of an idle mode of a receiver based on measurements by the receiver of a received power of at least one signal having a first carrier frequency and a pattern known to the receiver. The method of adapting includes using a first method of measuring the received power based on the pattern to generate a first power estimate based on a first duration of the at least one signal; comparing the first power estimate to a first threshold; and based on the comparing, either using the first method of measuring to generate another first power estimate or performing the following: using a second method of measuring the received power based on the pattern to generate a second power estimate, the second method being different from the first method and the second power estimate being based on a second duration of the at least one signal; and measuring a received power of at least one signal having a second carrier frequency.

BRIEF DESCRIPTION OF THE DRAWINGS

The several features, objects, and advantages of this invention will be understood by reading this description in conjunction with the drawings, in which.

DETAILED DESCRIPTION

The inventor has recognized that the methods and apparatus for measuring received signal power for cell selection/reselection measurements (e.g., RSRP and similar parameters) in Idle Mode in 3G LTE and similar communication systems can be adapted based on whether an inter-frequency or IRAT measurement is needed. Adaptation based on estimated signal power level is described in detail in U.S. patent application Ser. No. 12/143,975 filed on Jun. 23, 2008, by B. Lindoff et al. Adaptation based on either or both of the estimated (measured) signal power level and the relative timing between the measurement interval and the cell timing such that computationally intensive channel and signal-power estimation methods are used only when necessary is described in U.S. patent application Ser. No. 12/421,104 filed on Apr. 9, 2009, by J. Flordelis et al.

As described in more detail below, if inter-frequency or IRAT measurements are not needed (e.g., only intra-frequency measurements are needed), then the UE can operate normally, with fewer measurement samples and reduced UE-receiver duty cycle (i.e., the ratio of receiver on-time to receiver off-time), saving UE resources, such as battery power.

In an LTE system, for example, the UE turns on its receiver for two subframes during every DRX cycle, and develops an RSRP estimate by averaging RSRP measurement samples accumulated over four subframes, i.e., averaging over two DRX cycles. If the RSRP estimate of the UE's serving cell is less than a threshold and there are no strong (e.g., no detected) neighboring intra-frequency cells, then inter-frequency or IRAT measurements are needed, and according to the usual procedure, the UE immediately begins such measurements.

In contrast to the usual procedure, the UE in Idle Mode preferably can increase the accuracy of its RSRP estimate of the best intra-frequency cell it is receiving, which would usually be its serving cell, before carrying out the inter-frequency or IRAT measurements. To increase the estimate accuracy, the UE can accumulate more RSRP signal samples of the serving cell or use a more advanced method of computing the RSRP measurement, thereby reducing the risk of falsely triggering inter-frequency or IRAT cell selection/re-selection.

Of course, there are a number of ways the UE can adaptively increase the number of measurement samples by keeping the UE's receiver powered on for longer times. As just two of many possible examples in an LTE system, the UE can advantageously turn on its receiver for four subframes twice every DRX cycle, or for eight subframes once every DRX cycle. In either example, the UE makes an RSRP measurement by averaging the increased number of RSRP measurement samples accumulated over the increased number of subframes.

Figure 4:
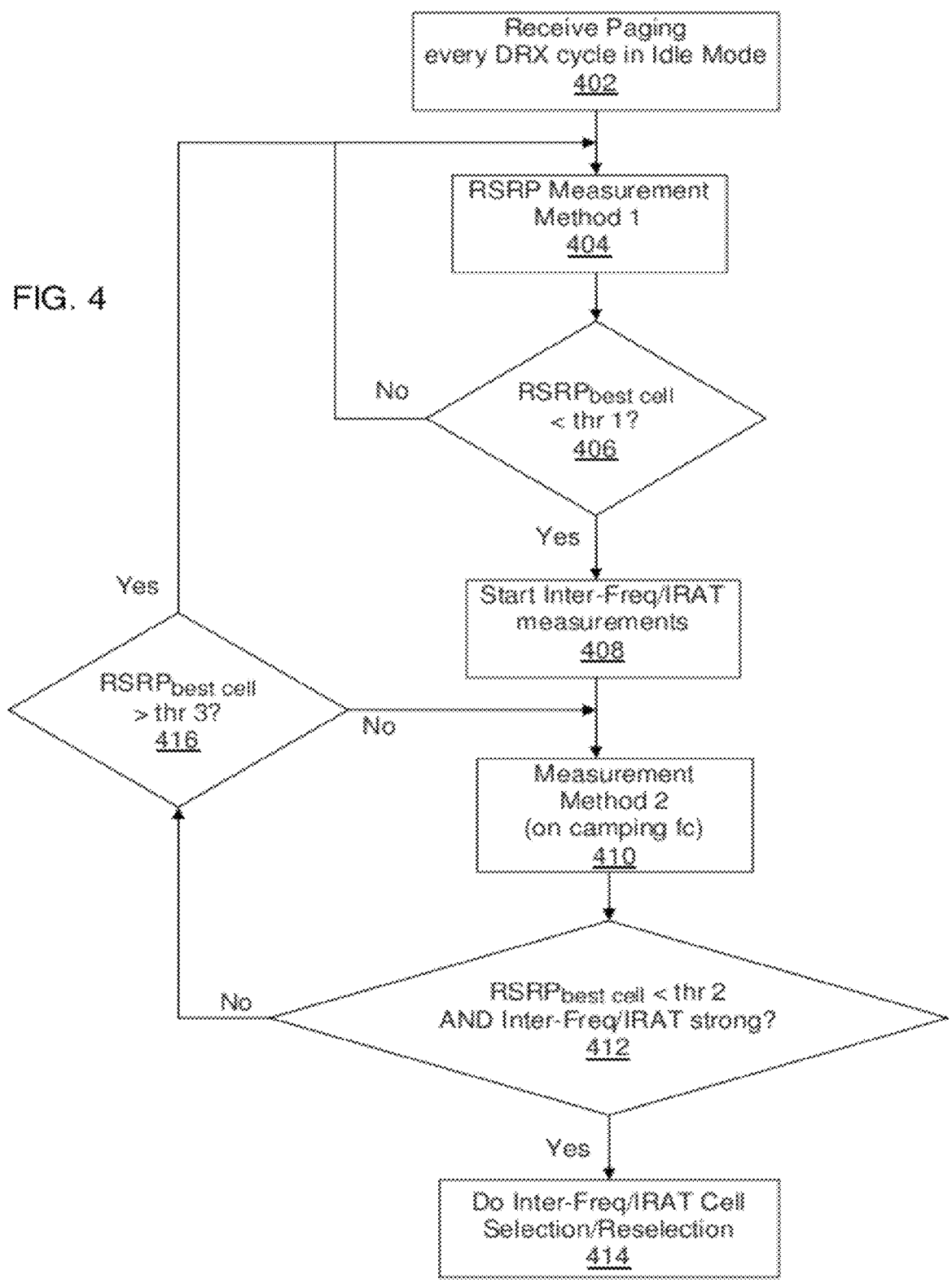
FIG. 4 is a flow chart of an adaptive measurement method.

FIG. 4 is a flow chart of a suitable method of adapting operation of a receiver based on measurements of a received power. In this example, the UE is operating in Idle Mode and is assumed to be camped on a cell that has a carrier with frequency fc. From time to time, the UE carries out a specified cell search procedure, e.g., for determining neighboring cells to be used as potential handover candidates and for other purposes. The flow chart illustrates measurements on only the camped-on carrier (fc) simply for convenience, and the artisan will understand that the method can be readily extended to measurements on other frequency carriers. It will also be understood that any suitable measurement method can be used for the inter-frequency or IRAT measurements, including the "simple" method described above and more advanced methods.

In step 402, the UE receives signals from a cell that it receives best among several possible cells that the UE receives, including signals having known patterns that enable the UE to estimate the received signal power, by powering on its receiver for appropriate periods of time at appropriate times. The best cell is typically but not necessarily the UE's serving cell. In step 404, the UE uses a first method of measuring the received power based on the pattern to generate a first power estimate based on a first number of measurement samples. For example, the first measurement method can be the averaging method of Eq. 3 above and the first number of measurement samples can be accumulated in two subframes during every DRX cycle.

If the UE's signal power measurement estimate does not pass a first threshold thr 1 (No in step 406), the process flow returns to generating intra-frequency signal power estimates in the usual way (step 404). If the measurement estimate passes the first threshold thr 1 (Yes in step 406), the UE takes the steps it needs to begin to conduct IRAT received signal power measurements (step 408). For example, the UE can trigger inter-frequency or IRAT signal measurements by sending a message to the network about needed inter-frequency or IRAT measurements and receiving information from the network about RAT(s) and carrier frequencies on which to do measurements. In other embodiments, the UE can receive and locally store such information when it registers on the camping cell, and then the UE can, on a regular basis, continue to do RSRP measurements on intra-frequency cells (using the second method, for example) and also at regular instances do RSRP (or similar) inter-frequency or IRAT measurements (on another carrier frequency). The UE typically does intra-frequency measurements in time with its paging cycle, and so the UE can directly afterward or even before tune its receiver to the other carrier and do inter-frequency or IRAT measurements. The UE can then turn off its receiver until its next paging occasion.

Before the UE carries out conventional inter-frequency or IRAT cell selection/reselection with its attendant network signaling, the UE uses a second method of measuring the received power of the best cell based on the pattern to generate a second intra-frequency received power estimate (step 410). As described in more detail below, the second method can include accumulating a greater number of measurement samples and developing the estimate according to the simple method of Eq. 3 or the second method can be a more advanced signal power measurement method.

In step 412, the UE determines whether the more accurate intra-frequency RSRP measurement of the best cell developed by the second method exceeds a second threshold thr 2 and the received signal power of a detected inter-frequency or IRAT cell is strong. By "strong" is meant that the signal strength of the strongest inter-frequency or IRAT cell is above a particular value that is typically received from the network and that can be considered a fourth threshold thr 4. If so (Yes in step 412), the UE carries out inter-frequency or IRAT cell selection or reselection according to the procedure specified for the communication system (step 414). If not (No in step 412), the UE determines (step 416) whether the intra-frequency measurement estimate of the best cell determined by the second method (step 410) exceeds a third threshold thr 3.

If the intra-frequency measurement estimate of the best cell does not exceed the third threshold thr 3 (No in step 416), the process flow returns to step 410, and the second method of measuring the received power of the best cell based on the pattern is used to generate another second intra-frequency power estimate. If it does (Yes in step 416), the process flow returns to step 404, and the first method of measuring the received power of the best cell based on the pattern is used to generate another first intra-frequency power estimate.

The relationship between the thresholds thr 1, thr 2, and thr 3 described above is preferably thr 3>thr 1>thr 2, although it will be appreciated that different relationships can be used and the logical flow of FIG. 4 can be adjusted accordingly. For example, the value of thr 3 can be about 1 dB to about 3 dB greater than the value of thr 1, and the value of thr 2 can be about 3 db to about 5 dB less than the value of thr 1. As noted above, the value of thr 4 (a "strong" cell) is typically an absolute value signaled to the UE from network and can be approximately 20 dB higher than the other thresholds. The threshold values (including the fourth threshold mentioned above) are signaled to the UE from the network, for example at registration or when IRAT messages are triggered (see above).

The first method can be a "simple" method, e.g., taking an average as described in Eq. 3, and the second method can be a more "advanced" method, e.g., using a Wiener filter. As an alternative, the first measurement method can be a "simple" method used on measurement samples accumulated during a first time period T1 and the second measurement method can be the same "simple" method used on measurement samples accumulated during a second, longer time period T2. As an example of the latter alternative, the first method can be the "simple" method used over a time period T1 during every DRX cycle and the second method can be the "simple" method used over the time period T1 twice or more every DRX cycle.

Figure 1:
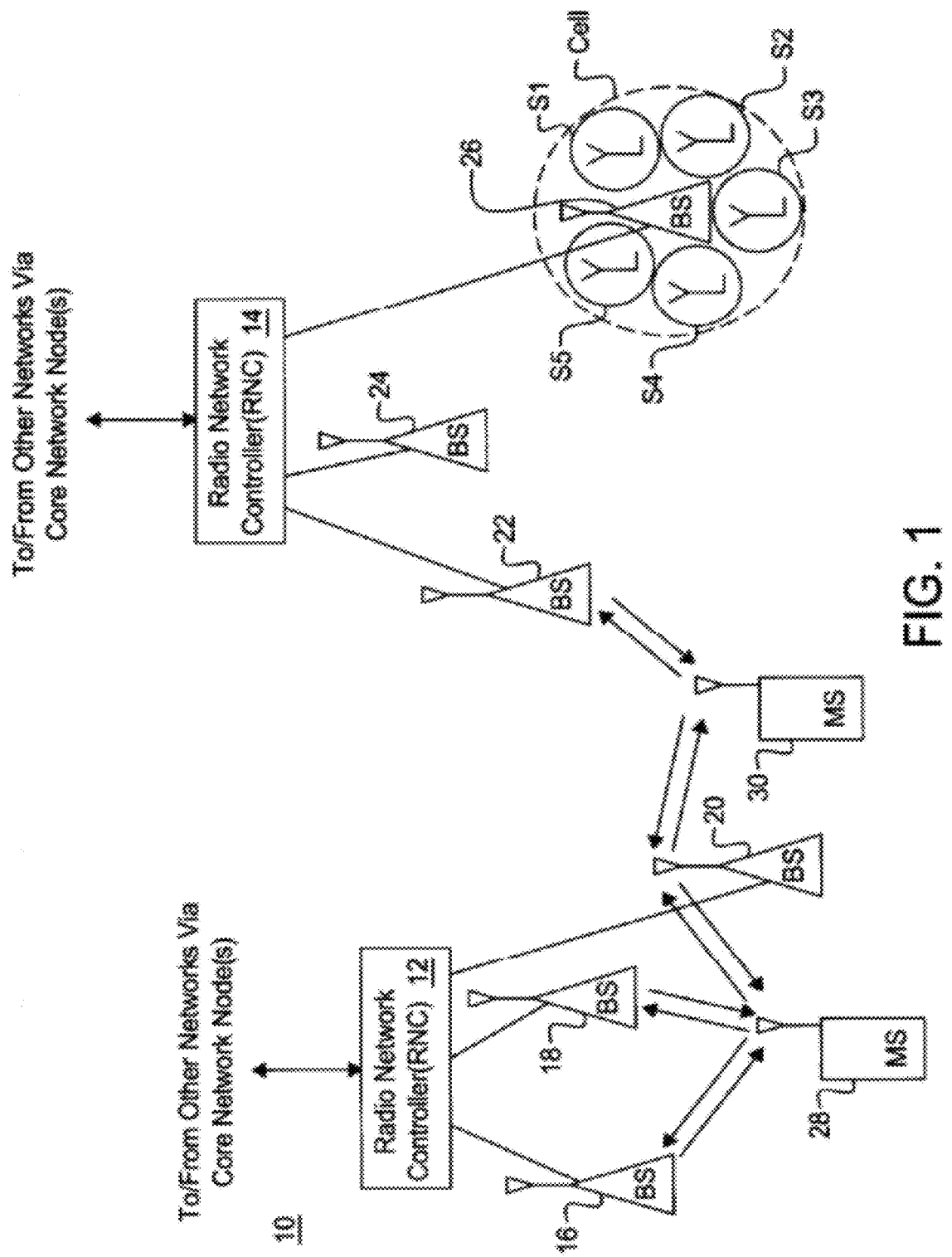
FIG. 1 depicts a cellular communication system.
Figure 2:
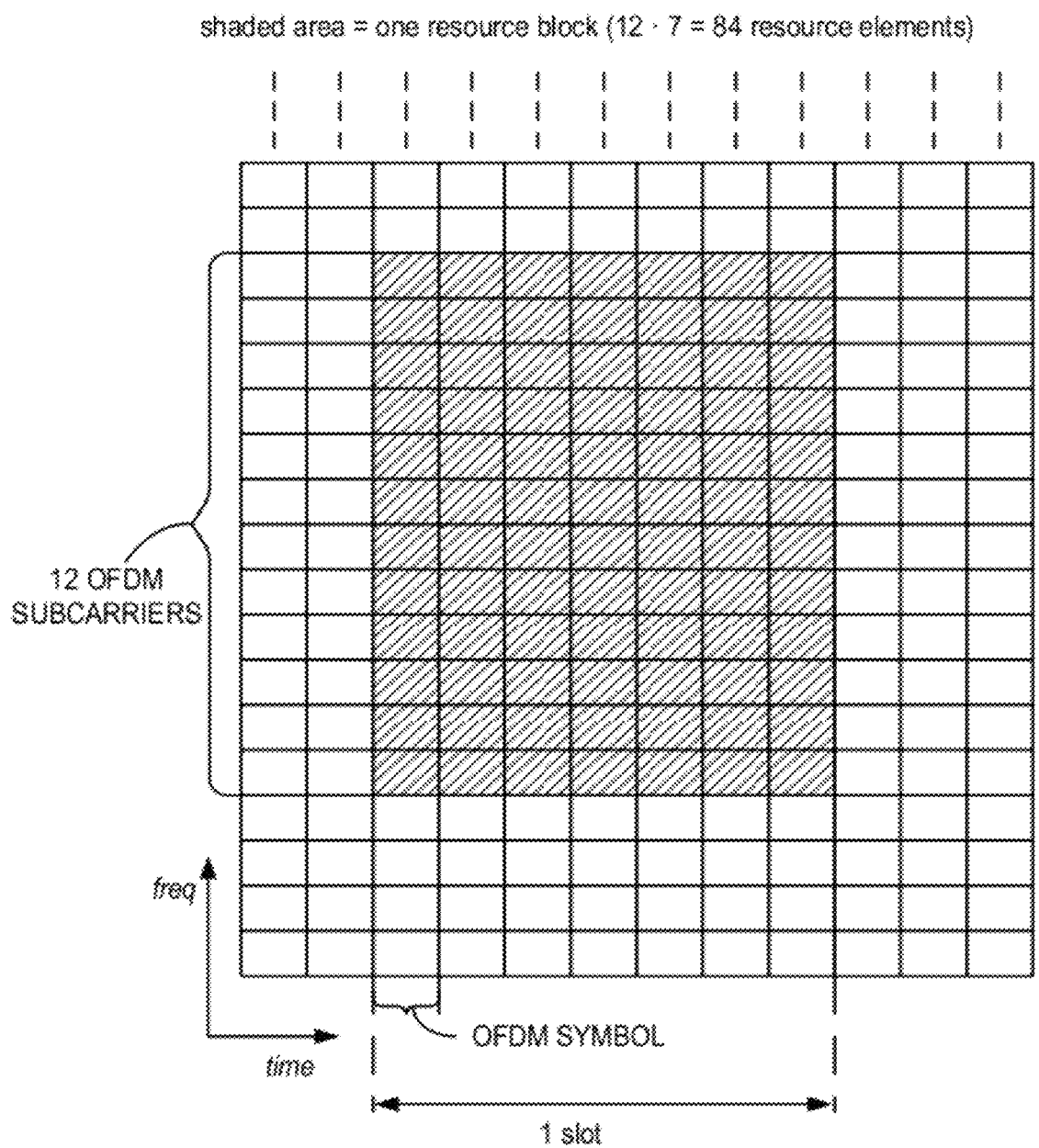
FIG. 2 depicts subcarriers and time intervals in a communication system that uses orthogonal frequency division multiple access.
Figure 3:
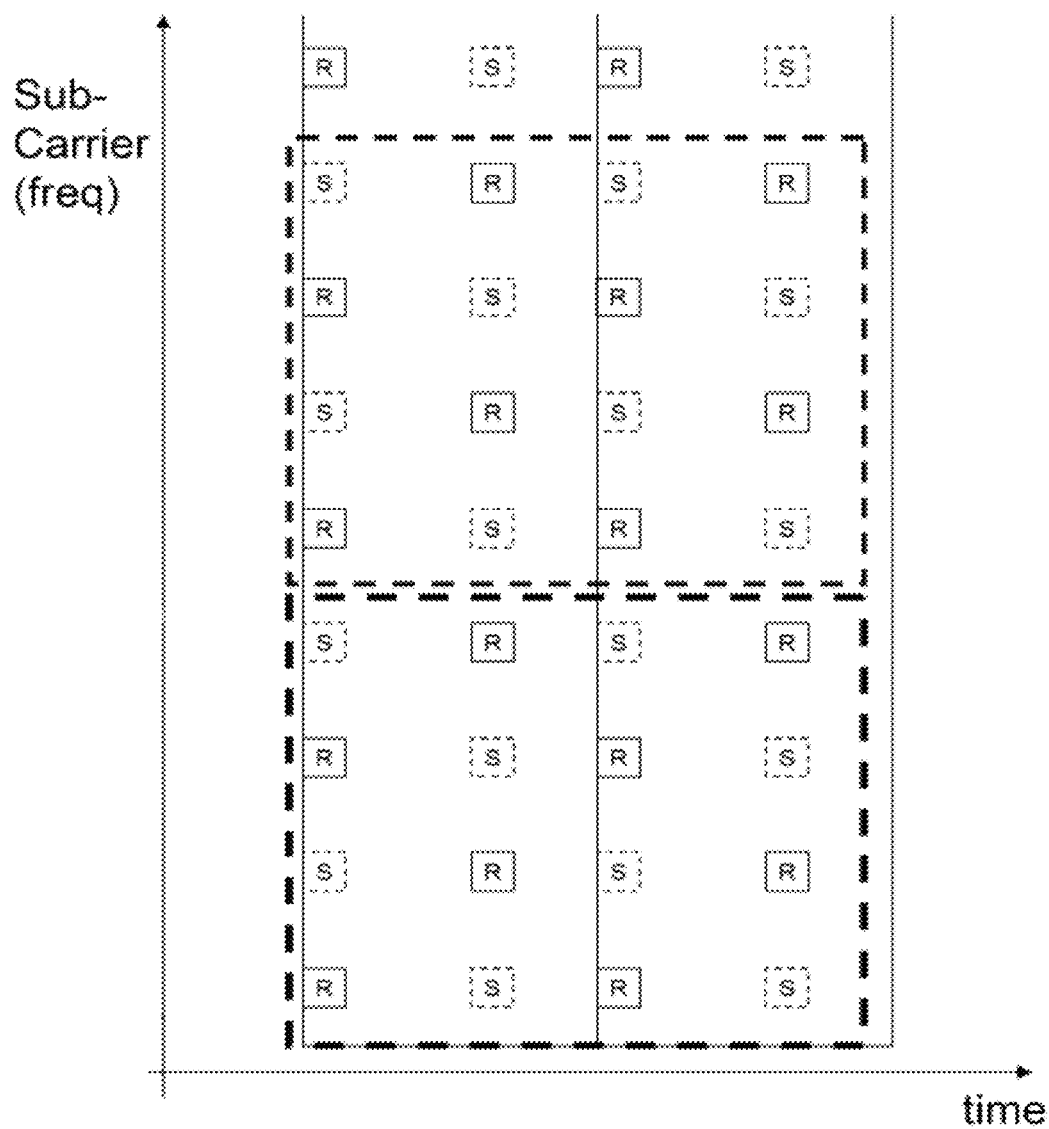
FIG. 3 depicts reference signals in a communication system that uses orthogonal frequency division multiple access.

As another alternative, the second, "more advanced" measurement method can include channel estimation based on one or more estimated channel characteristics, such as Doppler shift and delay spread, that can be expressed as follows:

$$S^{est} = \frac{1}{MN} \sum_{m,n} S_{m,n}^{est} = \frac{1}{MN} \sum_{m,n} \left| \sum_{l,k} a_{l-m,k-n} RS_{l-m,k-n}^{est} \right|^2 \qquad \text{Eq. 4}$$

in which the $a_{m,n}$ are suitable coefficients that depend on Doppler shift, delay spread, or other subcarrier channel characteristic; l and k are time and frequency indices, respectively; and m and n are indices of time and frequency positions of the channel response estimates $RS^{est}$ based on received reference symbols RS at totals of M and N time and frequency positions as depicted in FIG. 3.

According to Eq. 4, a received signal estimate $S_{m,n}^{est}$ is generated for each received reference symbol $RS_{m,n}$, and each such received signal estimate is generated by linear filtering of the neighboring RSs with filter coefficients $a_{l-m,k-n}$ that are a function of Doppler shift, delay spread, etc. As an example, the greater the Doppler shift, the faster |a| decays as |l−m| increases, and the greater the delay spread, the faster |a| decays as |k−n| increases.

It will be understood that although inter-frequency or IRAT measurements can be considered to an extent to be triggered by low signal strength, the inter-frequency/IRAT trigger threshold is a parameter that is typically chosen dynamically by the network, and so the other three threshold values are also dynamic. Because the trigger threshold is not fixed, the above described methods do not adapt the signal measurements based on a fixed signal strength level.

It will be appreciated that a measurement requirement might be set such that many are samples needed to obtain sufficient RSRP cell reselection performance. This invention describes a solution that reduces a UE's receiver's on-time in Idle Mode, enabling measurement only with sufficient performance based on the scenario.

Figure 5:
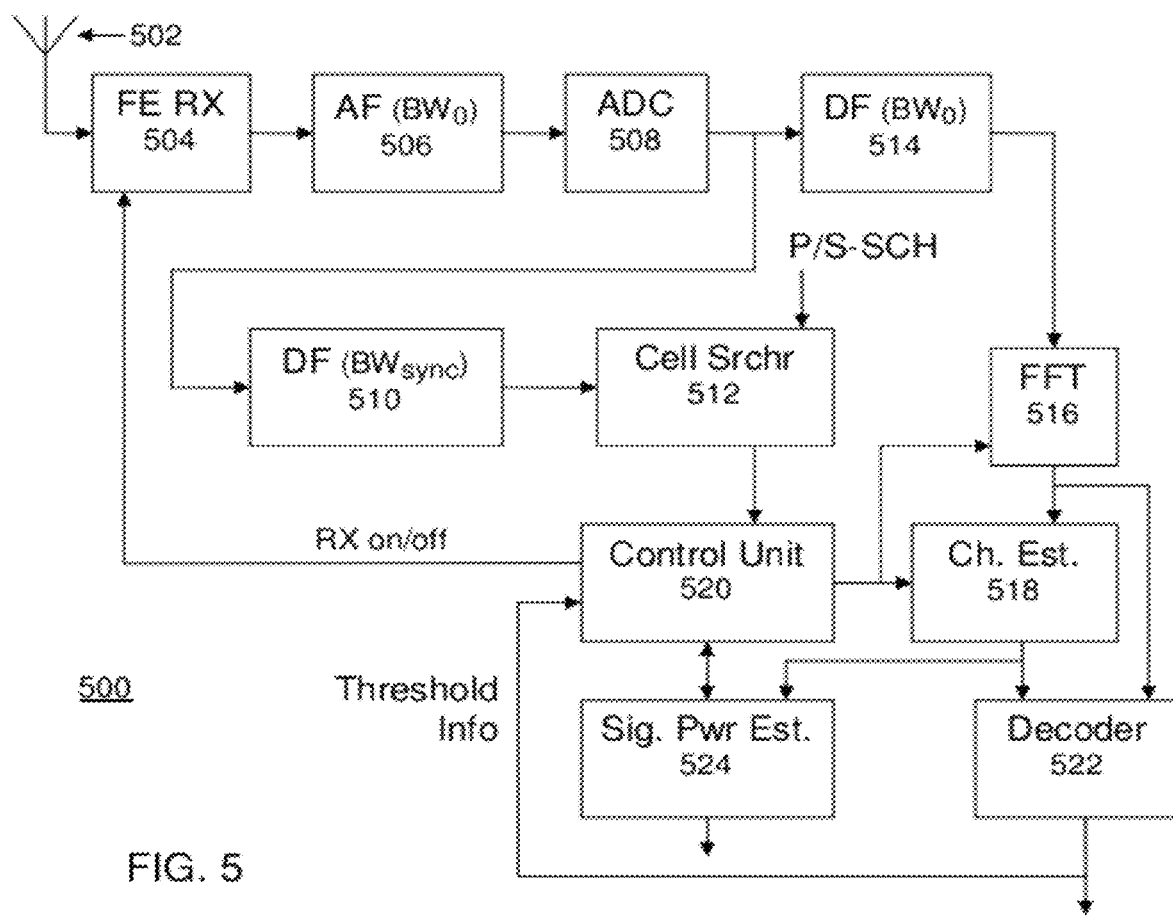
FIG. 5 is a block diagram of a portion of a receiver.

FIG. 5 is a block diagram of an arrangement 500 in a UE that can implement the methods described above. It will be appreciated that the functional blocks depicted in FIG. 5 can be combined and re-arranged in a variety of equivalent ways, and that many of the functions can be performed by one or more suitably programmed digital signal processors. Moreover, connections among and information provided or exchanged by the functional blocks depicted in FIG. 5 can be altered in various ways to enable a UE to implement other methods involved in the operation of the UE.

As depicted in FIG. 5, a UE receives a DL radio signal through an antenna 502 and typically down-converts the received radio signal to an analog baseband signal in a front end receiver (Fe RX) 504. The baseband signal is spectrally shaped by an analog filter 506 that has a bandwidth $BW_0$, and the shaped baseband signal generated by the filter 506 is converted from analog to digital form by an analog-to-digital converter (ADC) 508.

The digitized baseband signal is further spectrally shaped by a digital filter 510 that has a bandwidth $BW_{sync}$, which corresponds to the bandwidth of synchronization signals or symbols included in the DL signal. The shaped signal generated by the filter 510 is provided to a cell search unit 512 that carries out one or more methods of searching for cells as specified for the particular communication system, e.g., 3G LTE. Typically, such methods involve detecting predetermined primary and/or secondary synchronization channel (P/S-SCH) signals in the received signal.

The digitized baseband signal is also provided by the ADC 508 to a digital filter 514 that has the bandwidth $BW_0$, and the filtered digital baseband signal is provided to a processor 516 that implements a fast Fourier transform (FFT) or other suitable algorithm that generates a frequency-domain (spectral) representation of the baseband signal. A channel estimation unit 518 receives signals from the processor 516 and generates a channel estimate $H_{i,j}$ for each of several subcarriers i and cells j. For example, the unit 518 can generate the channel estimates according to either the first or the second estimation method as described above based on control and timing signals provided by a control unit 520, which also provides such control and timing information to the processor 516.

As described above, the estimator 518 provides the channel estimates $H_i$ to a decoder 522 and a signal power estimation unit 524. The decoder 522, which also receives signals from the processor 516, is suitably configured to extract threshold value and other information from RRC or other messages as described above and typically generates signals subject to further processing in the UE (not shown). The estimator 524 generates received signal power measurements (e.g., estimates of RSRP, received subcarrier power $S_i$, SIR, etc.). The estimator 524 can generate estimates of RSRP, RSRQ, RSSI, received subcarrier power $S_i$, SIR, etc., in various ways, for example, based on Eq. 3 or on Eq. 4 above, in response to control signals provided by the control unit 520. Power estimates generated by the estimator 524 are typically used in further signal processing in the UE.

In the arrangement depicted in FIG. 5, the control unit 520 keeps track of substantially everything needed to configure the processor 516, estimation unit 518, and estimator 524. For the estimation unit 518, this includes both method and cell identity (for RS extraction and cell-specific scrambling of RS). Communication between the searcher 512 and the control unit 520 includes cell identity and, for example, cyclic prefix configuration.

The control unit 520 determines which of the simple and more advanced estimation methods described above is used by the estimator 518 and/or by the estimator 524 for measurements on the detected cell(s) as described above. In particular, the control unit 520, which typically can include a comparator or implement a comparator function, can receive threshold values signaled by the network and can control the on/off times of the Fe RX 504 as described above.

It will be appreciated that procedures described above are carried out repetitively as necessary, for example, to respond to the time-varying nature of communication channels between transmitters and receivers. In addition, in terms of the downlink and a UE, it will be understood that the methods and apparatus described here can be implemented in a BS or other uplink receiving node.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless receivers implementing embodiments of this invention can be included in, for example, mobile telephones, pagers, headsets, laptop computers and other mobile terminals, base stations, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of adapting operation of an idle mode of a receiver based on measurements by the receiver of a received power of at least one signal having a first carrier frequency and a pattern known to the receiver, the method comprising:
using a first method of measuring the received power based on the pattern to generate a first power estimate based on a first duration of the at least one signal;
comparing the first power estimate to a first threshold; and
based on the comparing, either using the first method of measuring to generate another first power estimate or performing the following:
using a second method of measuring the received power based on the pattern to generate a second power estimate, the second method being different from the first method and the second power estimate being based on a second duration of the at least one signal; and
measuring a received power of at least one signal having a second carrier frequency.

2. The method of claim 1, wherein the second duration is greater than the first duration.

3. The method of claim 1, wherein the first method includes coherent averaging of a number M of received reference symbols followed by non-coherent averaging of N coherent averages.

4. The method of claim 1, further comprising:
when using the second method, comparing the second power estimate to a second threshold, and based on that comparing, determining whether to use the first method to generate another first power estimate or to use the second method to generate another second power estimate.

5. The method of claim 4, further comprising, based on that comparing, selecting the at least one signal having the second carrier frequency.

6. The method of claim 1, wherein the second measuring method includes estimating at least one channel characteristic expressed as follows:

$$S^{est} = \frac{1}{MN} \sum_{m,n} \left| \sum_{l,k} a_{l-m,k-n} RS^{est}_{l-m,k-n} \right|^2$$

in which $S^{est}$ represents a received signal power estimate, $RS^{est}$ represents a channel response estimate based on a received reference symbol, a is a coefficient that depends on the at least one channel characteristic, l and k are time and frequency indices; and m and n are indices of time and frequency positions of received reference symbols RS at totals of M and N time and frequency positions.

7. An apparatus for adapting operation of an idle mode of a receiver based on measurements by the receiver of a received power of at least one signal having a first carrier frequency and a pattern known to the receiver, the apparatus comprising:
a signal power estimator configured to use a first method of measuring the received power based on the pattern to generate a first power estimate based on a first duration of the at least one signal;
a control unit configured to compare the first power estimate to a first threshold, and based on the comparing, to cause the signal power estimator either to use the first method of measuring to generate another first power estimate or to perform the following:
use a second method of measuring the received power based on the pattern to generate a second power estimate, the second method being different from the first method and the second power estimate being based on a second duration of the at least one signal; and
measure a received power of at least one signal having a second carrier frequency.

8. The apparatus of claim 7, wherein the second duration is greater than the first duration, and the receiver is powered on for either the first duration or the second duration based on the whether the first measuring method or the second measuring method, respectively, is used.

9. The apparatus of claim 7, wherein the first method includes coherent averaging of a number M of received reference symbols followed by non-coherent averaging of N coherent averages.

10. The apparatus of claim 7, wherein the control unit is configured, when the second method is used, to compare the second power estimate to a second threshold, and based on that comparing, to cause the signal power estimator either to use the first method to generate another first power estimate or to use the second method to generate another second power estimate.

11. The apparatus of claim 10, wherein the control unit is further configured, based on that comparing, to select the at least one signal having the second carrier frequency.

12. The apparatus of claim 7, wherein the second measuring method includes estimating at least one channel characteristic expressed as follows:

$$S^{est} = \frac{1}{MN} \sum_{m,n} \left| \sum_{l,k} a_{l-m,k-n} RS^{est}_{l-m,k-n} \right|^2$$

in which $S^{est}$ represents a received signal power estimate, $RS^{est}$ represents a channel response estimate based on a received reference symbol, a is a coefficient that depends on the at least one channel characteristic, l and k are time and frequency indices; and m and n are indices of time and frequency positions of received reference symbols RS at totals of M and N time and frequency positions.

13. A computer-readable medium containing instructions that, when executed by the computer, cause the computer to carry out a method of adapting operation of an idle mode of a receiver based on measurements by the receiver of a received power of at least one signal having a first carrier frequency and a pattern known to the receiver, wherein the method of adapting comprising:
using a first method of measuring the received power based on the pattern to generate a first power estimate based on a first duration of the at least one signal;
comparing the first power estimate to a first threshold; and
based on the comparing, either using the first method of measuring to generate another first power estimate or performing the following:
using a second method of measuring the received power based on the pattern to generate a second power estimate, the second method being different from the first method and the second power estimate being based on a second duration of the at least one signal; and
measuring a received power of at least one signal having a second carrier frequency.

14. The medium of claim 13, wherein the second duration is greater than the first duration.

15. The medium of claim 13, wherein the first method includes coherent averaging of a number M of received reference symbols followed by non-coherent averaging of N coherent averages.

16. The medium of claim 13, wherein the method of adapting further comprises:
when using the second method, comparing the second power estimate to a second threshold, and based on that comparing, determining whether to use the first method to generate another first power estimate or to use the second method to generate another second power estimate.

17. The medium of claim 16, wherein the method of adapting further comprises, based on that comparing, selecting the at least one signal having the second carrier frequency.

18. The medium of claim 13, wherein the second measuring method includes estimating at least one channel characteristic expressed as follows:

$$S^{est} = \frac{1}{MN} \sum_{m,n} \left| \sum_{l,k} a_{l-m,k-n} RS^{est}_{l-m,k-n} \right|^2$$

in which $S^{est}$ represents a received signal power estimate, $RS^{est}$ represents a channel response estimate based on a received reference symbol, a is a coefficient that depends on the at least one channel characteristic, l and k are time and frequency indices; and m and n are indices of time and frequency positions of received reference symbols RS at totals of M and N time and frequency positions.

* * * * *